United States Patent
Vegh

(10) Patent No.: US 10,220,961 B2
(45) Date of Patent: Mar. 5, 2019

(54) AERIAL IMAGE CAPTURING SYSTEM

(71) Applicant: AERIAL SPHERE, LLC, Mesa, AZ (US)

(72) Inventor: Dennis J. Vegh, Mesa, AZ (US)

(73) Assignee: Aerial Sphere, LLC, Mesa, AZ (US)

( * ) Notice: Subject to any disclaimer, the term of this patent is extended or adjusted under 35 U.S.C. 154(b) by 301 days.

(21) Appl. No.: 15/083,031

(22) Filed: Mar. 28, 2016

(65) Prior Publication Data

US 2017/0026575 A1     Jan. 26, 2017

Related U.S. Application Data

(60) Provisional application No. 62/139,145, filed on Mar. 27, 2015.

(51) Int. Cl.
| | |
|---|---|
| *H04N 5/247* | (2006.01) |
| *B64D 47/08* | (2006.01) |
| *H04N 5/232* | (2006.01) |
| *H04N 5/225* | (2006.01) |

(52) U.S. Cl.
CPC ........... *B64D 47/08* (2013.01); *H04N 5/2251* (2013.01); *H04N 5/23203* (2013.01); *H04N 5/247* (2013.01)

(58) Field of Classification Search
CPC .................................. H04N 7/18; H04N 5/247
USPC .................................................. 348/144–147
See application file for complete search history.

(56) References Cited

U.S. PATENT DOCUMENTS

2010/0283854 A1\* 11/2010 McKaughan ............ G01C 3/08
348/144

\* cited by examiner

*Primary Examiner* — Anand S Rao
(74) *Attorney, Agent, or Firm* — Schmeiser, Olsen & Watts, LLP

(57) ABSTRACT

An aerial image capturing device is provided. The aerial image capturing device includes a camera array formed of multiple camera mounted to a camera array base. Aerial image capturing device further includes a mount for mounting the aerial image capturing device to the aircraft. The camera array base is moveably coupled to the mount by an actuating device, wherein the actuating device moves the camera array base away from and toward the mount. The movement of the camera array base allows for movement of the camera to a position to capture images without interference of the aircraft in the image. It also allows for moving the camera array into a position to not interfere with the landing gear. The aerial image capturing device may further include an image actuation device that synchronizes the image capturing of all of the cameras in the camera array.

20 Claims, 7 Drawing Sheets

AERIAL IMAGE CAPTURING SYSTEM

CROSS REFERENCE TO RELATED APPLICATION[S]

This application claims priority to U.S. Provisional Patent Application entitled "AERIAL IMAGE CAPTURING SYSTEM," Ser. No. 62/139,145, filed Mar. 27, 2015, the disclosure of which is hereby incorporated entirely herein by reference.

BACKGROUND OF THE INVENTION

Technical Field

This invention relates generally to an image capturing system and more particularly to an aerial image capturing system.

State of the Art

Aerial photography is useful for many different purposes. For example, aerial photography is used for cartography, land-use planning, archaeology, movie production, environmental studies, surveillance, commercial advertising, conveyancing, artistic projects, and many other purposes. Conventionally, the cameras are mounted in fixed positions within an aircraft, such as a winged aircraft or helicopters. The camera is then operated by a person in order to obtain the photo or image needed. In some instances, the control of the aircraft and/or the camera may be controlled remotely.

These conventional cameras mounted in a fixed location on an aircraft have their limitations. For example, the cameras do not allow for imagery to extend beyond the ends of the aircraft because of the location of the cameras, the cameras are limited in the types of imagery they can take, such as limited to oblique photographs and vertical photographs, thereby not allowing the capture of spherical imagery.

Accordingly, there is a need for an improved aerial image capturing system for use with aircraft.

DISCLOSURE OF THE INVENTION

The present invention relates to an aerial image capturing device for capturing spherical imagery using a camera array. The camera array is operatively coupled to an aircraft and operates to extend to a position below the aircraft in order to obtain spherical photos of the earth with minimal coverage of the spherical image in the sky by limiting that amount the aircraft in view of the camera lens. The aircraft does not intersect the horizon line. In order to capture the sky embodiment may include another camera on top of the aircraft pointing straight up. Then in post processing systems may merge the sky with the array from below the aircraft. The result is a full sphere image without the aircraft in the sphere.

An embodiment of an aerial image capturing device includes a camera array formed of multiple camera mounted to a camera array base. Aerial image capturing device further includes a mount for mounting the aerial image capturing device to the aircraft. The camera array base is moveably coupled to the mount by an actuating device, wherein the actuating device moves the camera array base away from and toward the mount. The aerial image capturing device may further include an image actuation device, wherein the image actuation device synchronizes the image capturing of all of the cameras in the camera array by timing the opening of the shutters to capture the image.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, the Figures are not necessarily drawn to scale, and:

DETAILED DESCRIPTION OF EMBODIMENTS OF THE INVENTION

As discussed above, embodiments of the present invention relate to an aerial image capturing device for capturing spherical imagery using a camera array. The camera array is operatively coupled to an aircraft and operates to extend to a position below the aircraft in order to obtain spherical photos of the earth without the aircraft being in view of the camera lens.

Figure 1:
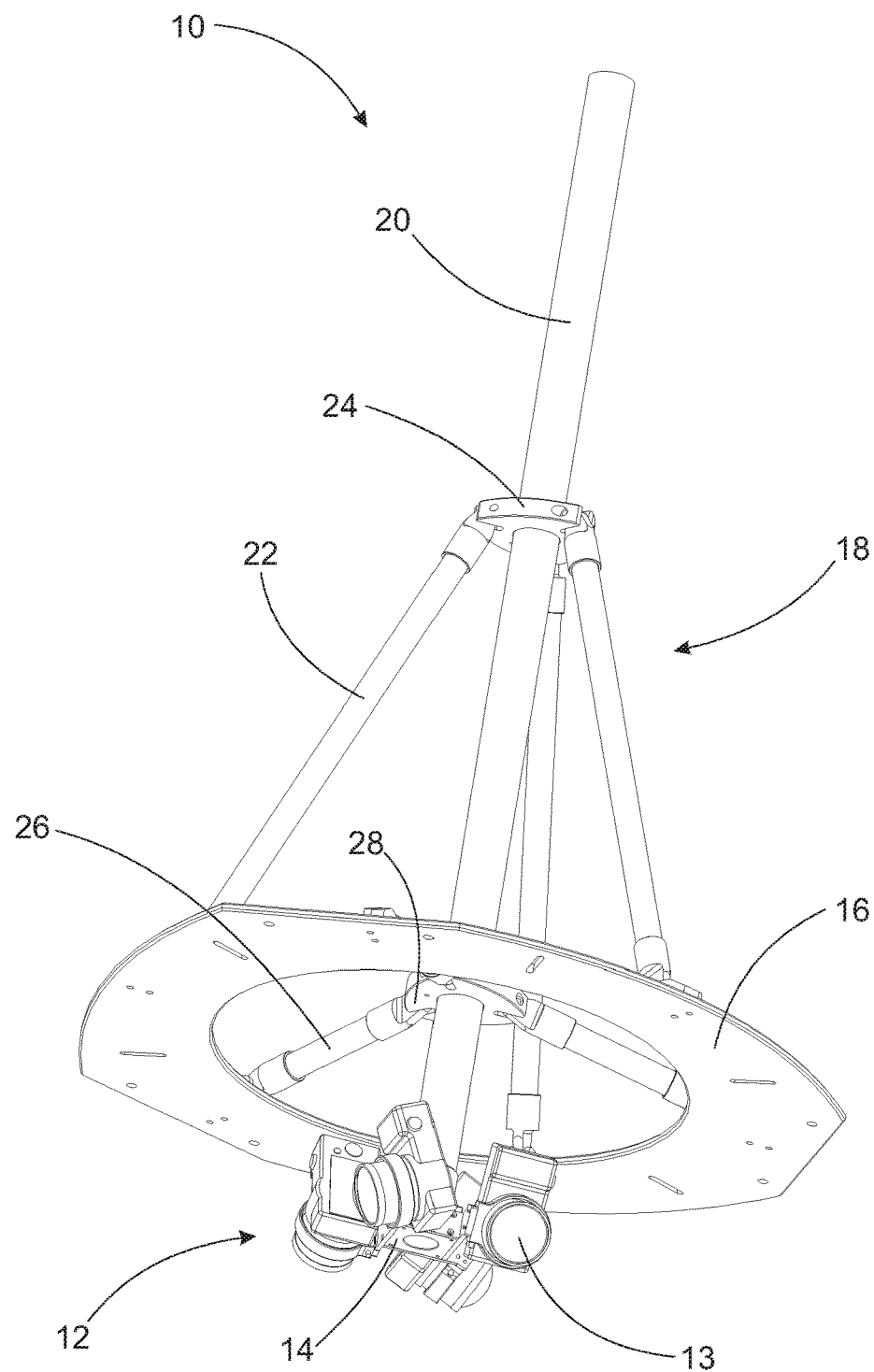
FIG. 1 is a perspective view of an aerial image capturing device.
Figure 2:
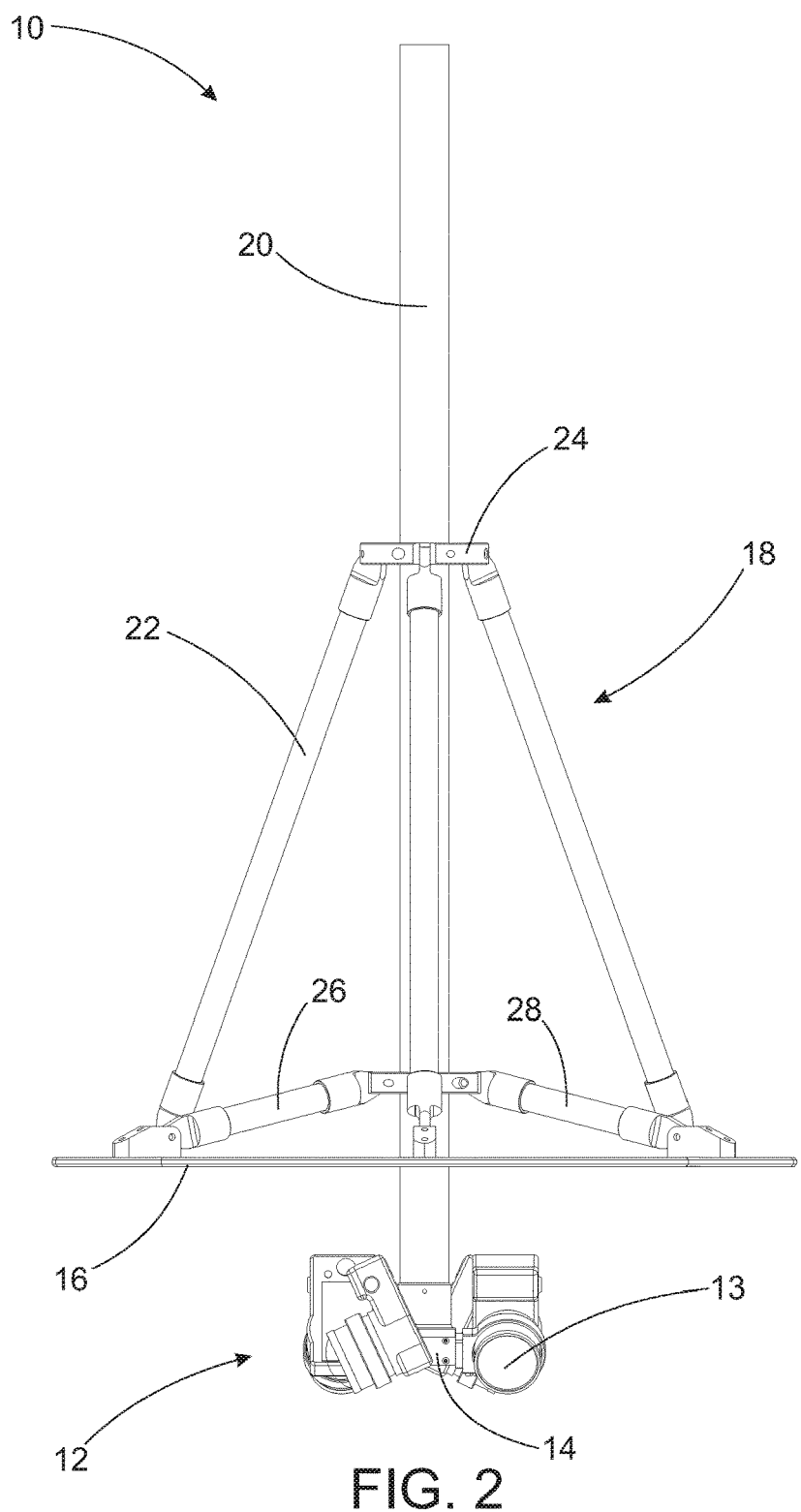
FIG. 2 is a front view of an aerial image capturing device.
Figure 3:
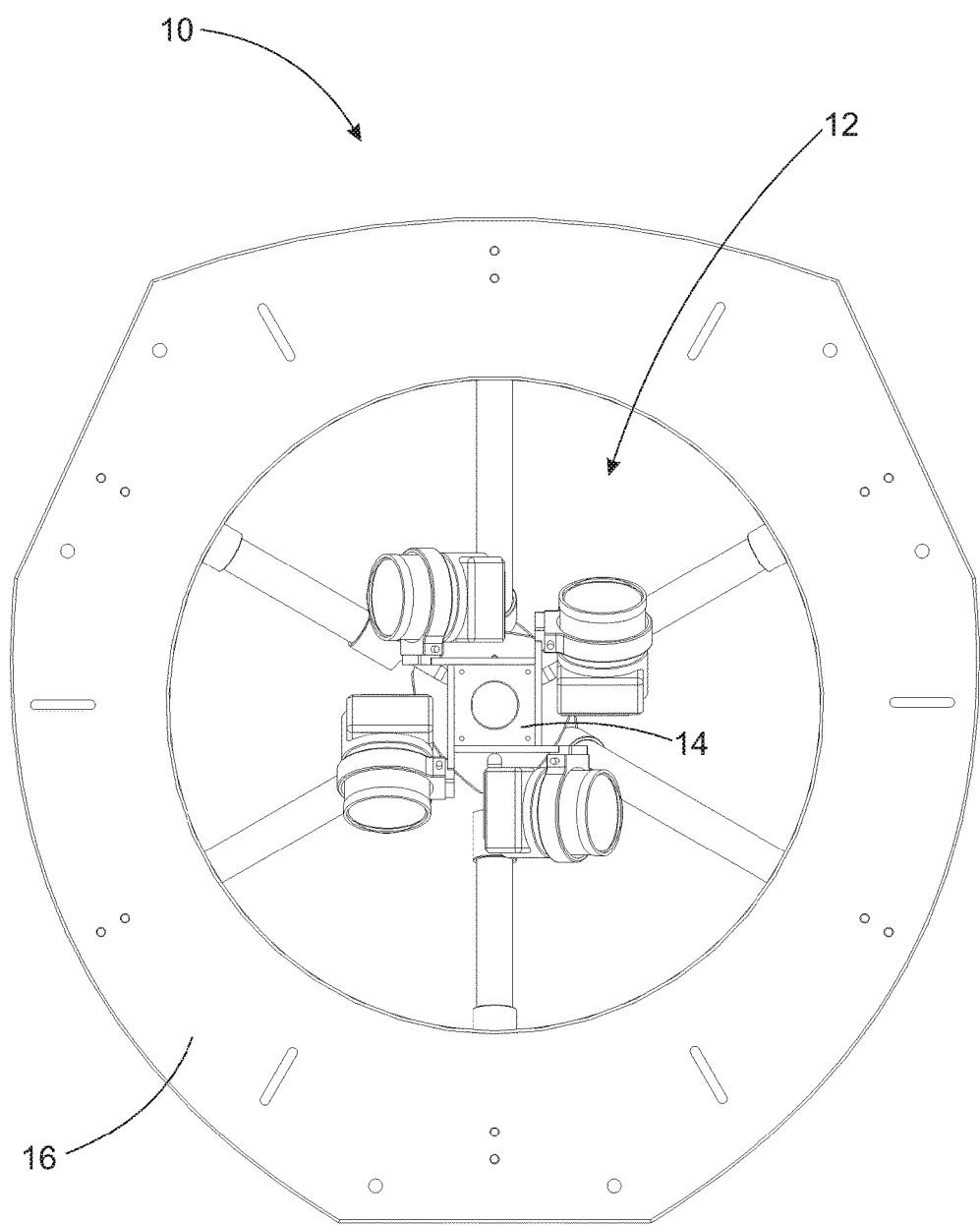
FIG. 3 is a bottom view of an aerial image capturing device.
Figure 4:
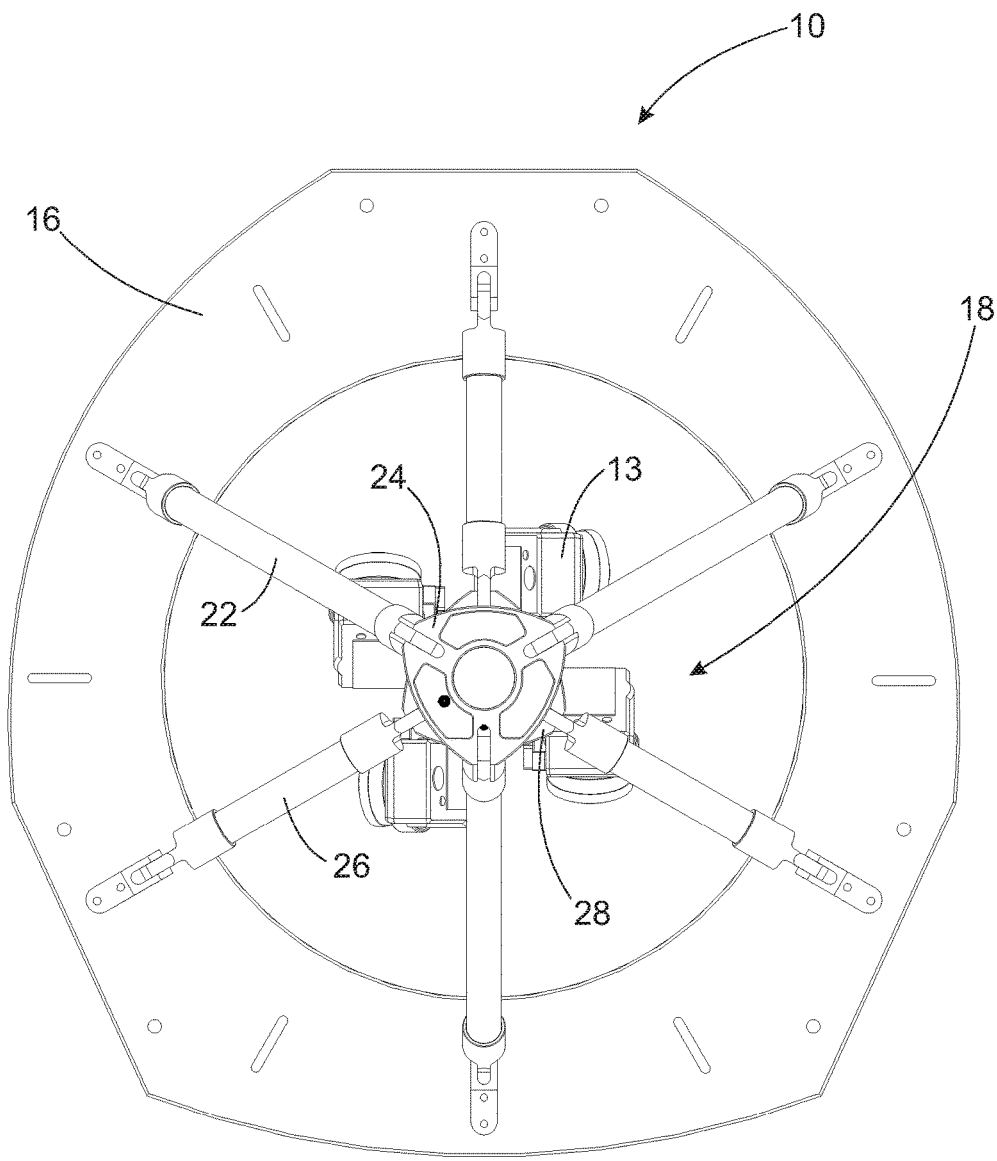
FIG. 4 is a top view of an aerial image capturing device.
Figure 5:
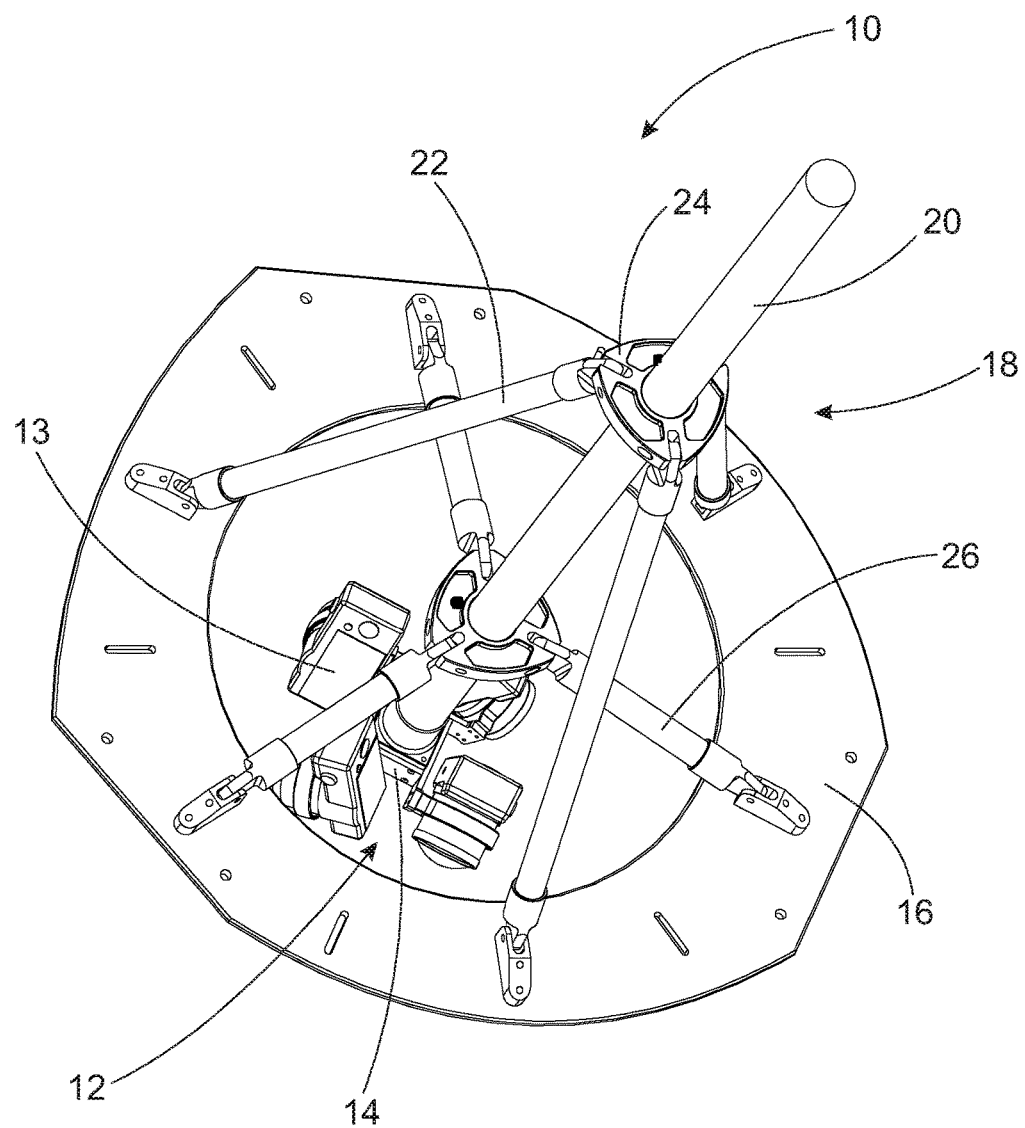
FIG. 5 is a top perspective view of an aerial image capturing device.

Referring to the drawings, FIG. 1 depicts an aerial image capturing device 10 for capturing spherical images. The device 10 includes a camera array 12 coupled to a camera array base 14. The camera array base 14 is moveably coupled to a mount 16 by use of an actuating device 18, wherein the mount 16 is coupled to an aircraft. The actuating device 18 moves the camera array base 14 away from and toward the mount 16.

In some embodiments, the camera array 12 includes a plurality of cameras 13. For example, and without limitation, as shown in the drawings, camera array 12 may include four cameras 13, while in other embodiments, the camera array 12 includes more than four cameras 13. In embodiments with the use of four cameras 13, the cameras 13 are coupled to the camera array base 14 such that each camera includes a lens aimed approximately 90 degrees to the lens of the cameras 13 adjacent to it. In camera arrays 12 having more than four cameras 13, the lens of each camera may be aimed at an angle with respect to the adjacent cameras that is equal, such as, for example and without limitation, five cameras 13 may have an angle between each camera of approximately 72 degrees, and so for the with more cameras 13 in the array 12. Additionally, some camera arrays 12 may include a camera facing straight down. Further, each camera tilts downward a predetermined angle to ensure that much of the desired capture area is within the center ⅔ of the lens. This camera array 12 allows for the capture of spherical images by taking an image with each camera 13 in the camera array 12 at a simultaneous time, such that the images of each camera overlap the images of the adjacent cameras 13.

Figure 6:
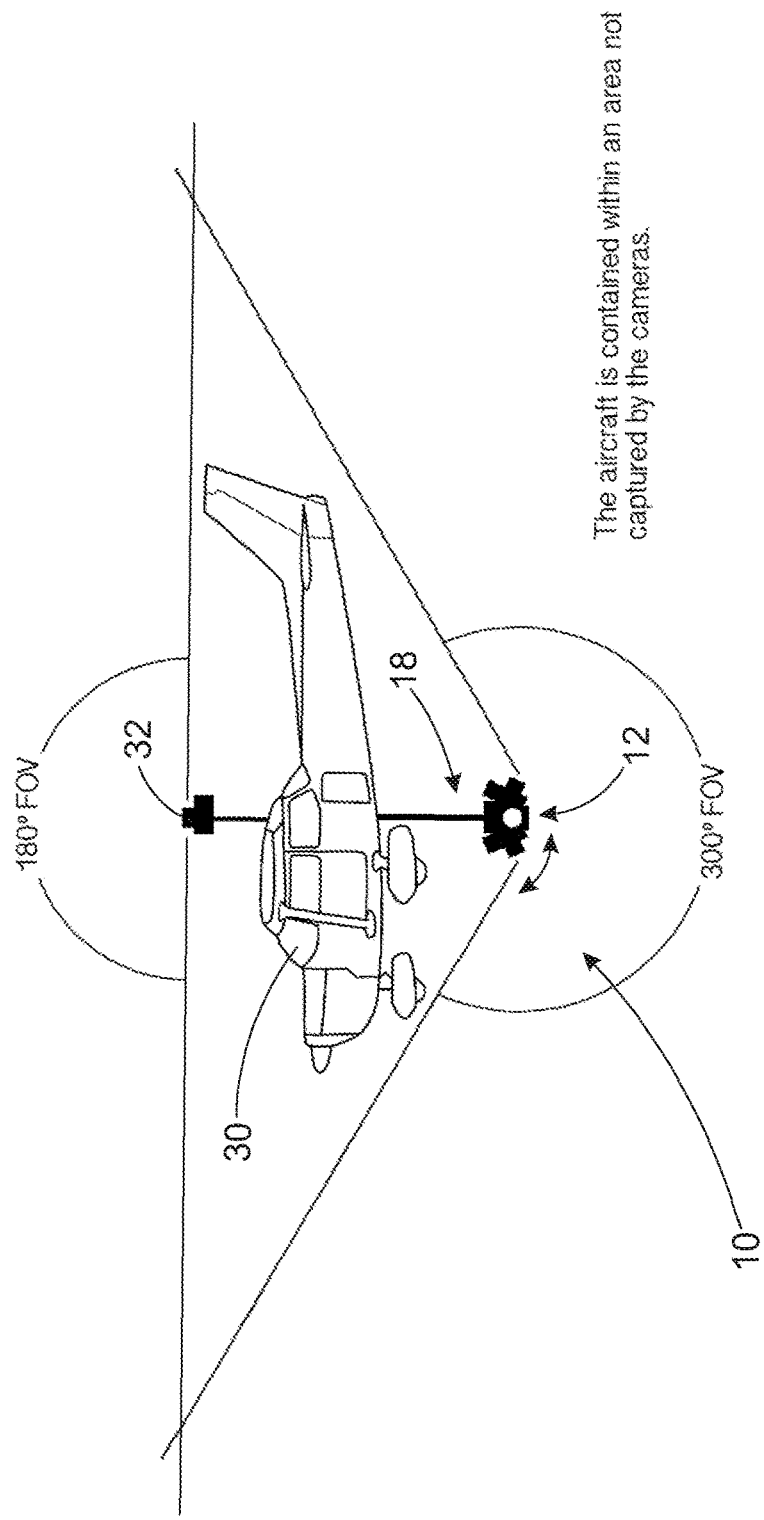
FIG. 6 is a side view of an aerial image capturing device coupled to an aircraft.

The camera array base 14 is moved up and down in and out of the aircraft by use of the actuating device 18. The actuating device 18 may be a telescopic rod 20 held in proper orientation with respect to the mount 16 by first support rods 22 and first support bracket 24 working in conjunction with second support rods 26 and second support bracket 28, wherein the telescopic rod 20 allows the camera array base 14 to move toward and away from the mount 16. When the camera array base 14 is moved toward the mount 16 the camera array 12 is located within the aircraft or adjacent a bottom surface of the aircraft. This allows the camera array 12 to move into a position that will not conflict with the landing gear of the air craft. When the camera array base 14 is moved away from the mount 16, the camera array extends below the bottom surface of the aircraft 30, wherein the cameras 13 are low enough to obtain spherical photos of the earth with minimal coverage of the spherical image in the sky by limiting that amount the aircraft 30 in view of the camera lens, as shown in FIG. 6. The aircraft 30 does not intersect the horizon line. In order to capture the sky embodiment may include another camera 32 on top of the aircraft 30 pointing straight up. Then in post processing systems may merge the sky with the array from below the aircraft 30. The result is a full sphere image without the aircraft in the sphere. The movement of the camera array base 14 is done in flight and not during take-off and landing.

In other embodiments, the actuating device may be a rod 20 that is not telescopic. Rather the rod 20 is at a predetermined particular length to place the cameras 13 low enough to obtain spherical photos of the earth with minimal coverage of the spherical image in the sky by limiting that amount the aircraft 30 in view of the camera lens, as shown in FIG. 6, wherein the aircraft 30 does not intersect the horizon line. The rod 20 may be pivotally coupled to the aircraft 30, wherein the rod 20 with the cameras 13 attached may be rotated out of the aircraft 30 and into position for capturing images during flight.

The aerial image capturing device 10 may include an image actuation device (not shown). The image actuation device may include a trigger that activates the shutter release button of the camera 13. The image actuation device may include electronics that control the shutter release of each camera 13 in the camera array 12, such that the image actuation device 20 provides for synchronized operation of the shutter release of each camera to provide substantially simultaneous image capturing of each camera 13 in the camera array 12. The image actuation device may be manually controlled. Further, in some embodiments, the image actuation device may be automatically triggered using georeferences. In these systems, the geographic position of the camera array 12 is determined using a GPS device or other geo-locating device, and the image actuation device automatically activates when predetermined geo-references are aligned with the camera array 12. In particular embodiments triggering the camera array 12 may be performed in equal geospatial increments using GPS. In other words, the camera array may be triggered when 'X' distance is flown. Typically ½ mile or 1 mile increments, however, any increment may be used.

This allows for capturing of images in a series along the path of travel of the aircraft without the need of controlling the speed of the aircraft because the series of images are captured based on the geo-location of the camera array 12.

Additionally, the aerial image capturing device 10 may further include an inertial measurement unit (not shown). The inertial measurement unit may be coupled at or near the camera array 12. For example and without limitation, the inertial measurement unit may be coupled to camera array base 14. The inertial measurement data operates to log the pitch, bank and yaw data of the camera array 12 at the instant the camera array 12 is activated to take a picture. The inertial measurement unit provides the attitude of the camera array 12 to associate with the image taken in order to digitally transform the captured image from the camera array to level the image during post processing. In other words, during post processing, a computer or other computing device may account for the pitch, bank and yaw data logged by the inertial measurement unit and adjust the digital image to account for the attitude of the camera at the time the image was captured.

Figure 7A:
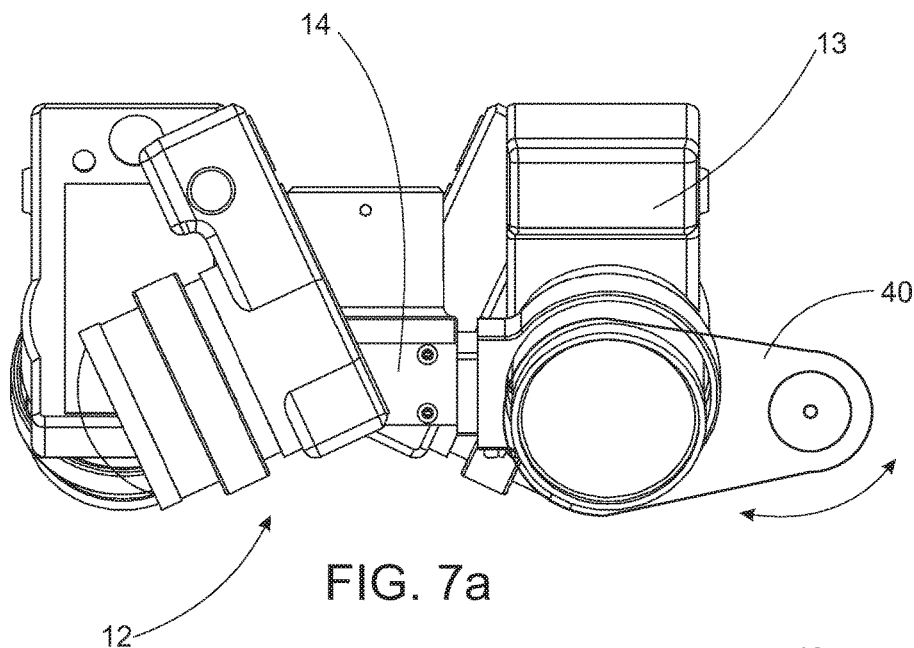
FIG. 7a is a front view of an aerial image capturing device with a lens protector in the protective position.
Figure 7B:
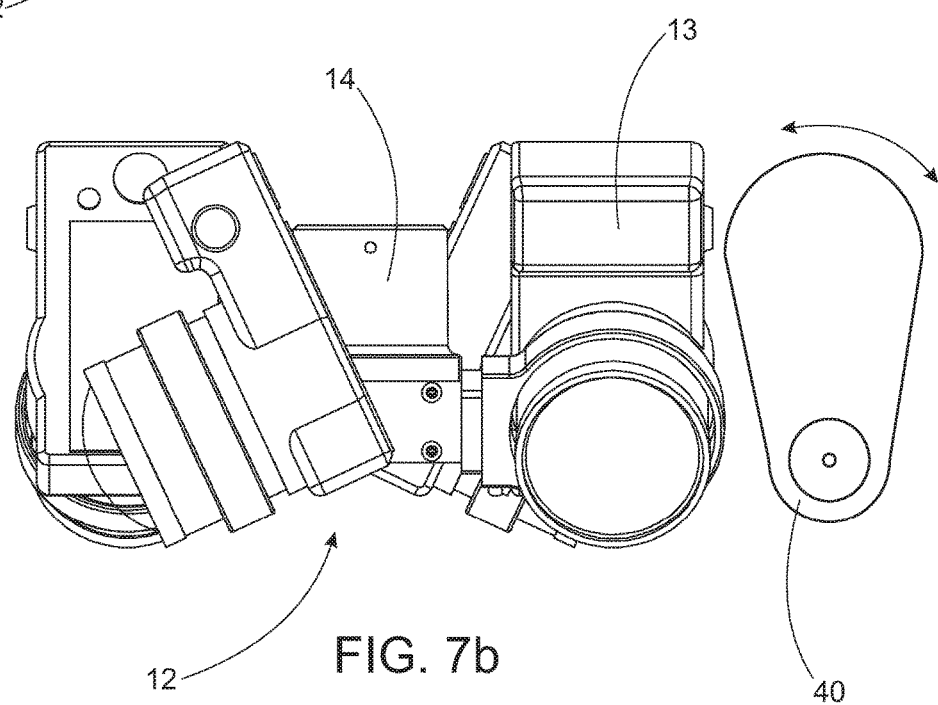
FIG. 7b is a front view of an aerial image capturing device with a lens protector in the captured position.

Referring to FIGS. 7a-7b, the aerial image capturing device 10 may include a lens protector 40. The lens protector 40 is moveably coupled adjacent the lens of the camera 13 of the camera array 12 facing a front of the aircraft, wherein prior to activation of the image actuation device. The lens protector 40 is moved from a protective position covering the lens as shown in FIG. 7a to a capturing position away from the lens of the camera 13 as shown in FIG. 7b. This ensures that the lens protector 40 does not interfere with the image captured by the lens of the camera 13. The lens protector 40 operates to protect the lens from being damaged or obscured by hitting a bug or other object on the lens during flight. The lens protector 40 moves away for a short period of time only during actual capture of an image to reduce the exposure of the lens to being contacted by a bug or other object. The lens protector 40, as shown in FIGS. 7a-7b is moveable by rotation between the protective position and the captured position.

The components defining any aerial image capturing device may be formed of any of many different types of materials or combinations thereof that can readily be formed into shaped objects provided that the components selected are consistent with the intended operation of an aerial image capturing device. For example, the components may be formed of: rubbers (synthetic and/or natural) and/or other like materials; glasses (such as fiberglass) carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Furthermore, the components defining any aerial image capturing device may be purchased pre-manufactured or manufactured separately and then assembled together. However, any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components. Other possible steps might include sand blasting, polishing, powder coating, zinc plating, anodizing, hard anodizing, and/or painting the components for example.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. An aerial image capturing device comprising:
   a camera array formed of multiple cameras mounted to a camera array base;
   a mount coupled to an aircraft and located adjacent a bottom surface of the aircraft, wherein the camera array base is moveably coupled to the mount by an actuating device, and wherein the actuating device moves the camera array base away and toward the bottom surface of the aircraft; and
   an image actuation device, wherein the image actuation device synchronizes the image capturing of all of the cameras in the camera array by timing the opening of the shutters to capture an image.

2. The device of claim 1, wherein the camera array is formed with four cameras.

3. The device of claim 2, wherein the four cameras of the camera array each comprise a lens that aimed approximately 90 degrees from the direction of adjacent cameras of the camera array.

4. The device of claim 3, wherein each camera of the camera array tilts downward a predetermined angle to ensure that most of the desired capture area is within the center ⅔ of the lens.

5. The device of claim 1, wherein the actuating device is a telescopic rod.

6. The device of claim 5, wherein the telescopic rod is moveably mounted to the mount and telescopes the camera array into and out of the aircraft.

7. The device of claim 1, wherein image captured is a spherical image.

8. The device of claim 7, wherein the spherical image is captured by the camera array in response to taking an image with each camera in the camera array at a simultaneous time, such that the images of each camera overlap the images of the adjacent cameras.

9. The device of claim 1, wherein the image actuation device includes electronics that control a shutter release of each camera in the camera array, wherein the image actuation device provides synchronized operation of the shutter release of each camera to provide substantially simultaneous image capturing of each camera in the camera array.

10. The device of claim 9, wherein the image actuation device is manually activated.

11. The device of claim 9, wherein the image actuation device is automatically triggered using geo-references.

12. An aerial image capturing device comprising:
    a camera array formed of at least four cameras mounted to a camera array base, wherein the at least four cameras of the camera array each comprise a lens that aimed approximately an equal angle from the direction of adjacent cameras of the camera array;
    a mount coupled to an aircraft and located adjacent a bottom surface of the aircraft, wherein the camera array base is moveably coupled to the mount by an actuating device, and wherein the actuating device moves the camera array base away and toward the bottom surface of the aircraft; and
    an image actuation device, wherein the image actuation device synchronizes the image capturing of all of the cameras in the camera array by timing the opening of the shutters to capture an image.

13. The device of claim 12, wherein each camera of the camera array tilts downward a predetermined angle to ensure that most of the desired capture area is within the center ⅔ of the lens.

14. The device of claim 12, wherein the actuating device is a telescopic rod moveably mounted to the mount and telescopes the camera array into and out of the aircraft.

15. The device of claim 12, wherein the actuating device is a rod rotatably mounted to the mount and rotates the camera array into and out of the aircraft.

16. The device of claim 12, wherein image captured is a spherical image, wherein the spherical image is captured by the camera array in response to taking an image with each camera in the camera array at a simultaneous time, such that the images of each camera overlap the images of the adjacent cameras.

17. The device of claim 12, wherein the image actuation device includes electronics that control a shutter release of each camera in the camera array, wherein the image actuation device provides synchronized operation of the shutter release of each camera to provide substantially simultaneous image capturing of each camera in the camera array.

18. The device of claim 12, further comprising an inertial measurement unit coupled at the camera array, wherein the inertial measurement unit produces inertial measurement data and logs the pitch, bank and yaw data of the camera array at the instant the camera array is activated to capture an image.

19. An aerial image capturing device comprising:
    a camera array coupled to an aircraft, wherein the camera array is located outside of the aircraft;
    an image actuation device, wherein the image actuation device operates the opening of a shutter of the camera to capture an image; and
    a lens protector, wherein the lens protector is moveably coupled adjacent the lens of the camera of the camera array facing a front of the aircraft, wherein prior to activation of the image actuation device, the lens protector is moved from a protective position covering the lens to a capturing position away from the lens of the camera to not interfere with the image captured by the lens.

20. The device of claim 8, wherein the lens protector is rotatable between the protective position and the captured position.

* * * * *